United States Patent
Koga

[19]
[11] Patent Number: 5,821,706
[45] Date of Patent: Oct. 13, 1998

[54] CONTROL APPARATUS AND METHOD FOR INITIATING POWER GENERATION FOR HYBRID ELECTRIC AUTOMOBILE

[75] Inventor: Hisamitsu Koga, Okazaki, Japan

[73] Assignee: Mitsubishi Jidosha Kogyo Kabushiki Kaisha, Tokyo, Japan

[21] Appl. No.: 722,493

[22] Filed: Sep. 27, 1996

[30] Foreign Application Priority Data

Sep. 28, 1995 [JP] Japan .................................... 7-250388
Sep. 28, 1995 [JP] Japan .................................... 7-250390
Aug. 30, 1996 [JP] Japan .................................... 8-230010

[51] Int. Cl.$^6$ .................................................. H07P 7/00
[52] U.S. Cl. ............................................ 318/139; 322/11
[58] Field of Search .................................... 318/139, 140, 318/145–147, 157, 158; 307/61, 68, 69; 180/65.4; 322/11

[56] References Cited

U.S. PATENT DOCUMENTS

| | | |
|---|---|---|
| 5,327,991 | 7/1994 | Yoshida . |
| 5,441,122 | 8/1995 | Yoshida . |
| 5,461,289 | 10/1995 | Adler et al. ............................ 318/139 |
| 5,492,190 | 2/1996 | Yoshida . |
| 5,552,681 | 9/1996 | Suzuki et al. .......................... 318/139 |
| 5,566,774 | 10/1996 | Yoshida ................................. 180/65.4 |
| 5,589,743 | 12/1996 | King ....................................... 318/136 |
| 5,614,809 | 3/1997 | Kiuchi et al. ............................ 322/11 |

OTHER PUBLICATIONS

English language abstract of Japanese Laid–Open Patent 5-242915.
English language abstract of Japanese Laid–Open Patent 6-14407.

*Primary Examiner*—Jonathan Wysocki

[57] ABSTRACT

A power generation control apparatus of a hybrid electric automobile includes an electric motor for driving driving wheels of the hybrid electric automobile, a power supply device for supplying electric power to the electric motor, a generator for supplying electric power to the electric motor and/or the power supply device, and an internal-combustion engine for driving the generator. Initially, an operating condition of the hybrid electric automobile is detected, and a required output of the electric motor is obtained based on the operating condition, and electric power corresponding to the required output is supplied to the motor. Meanwhile, an actual output generated by the motor is detected, while a required minimum output value to be generated by the motor is determined. Power generation by the generator is controlled based on the actual output and the required minimum output value.

17 Claims, 8 Drawing Sheets

CONTROL APPARATUS AND METHOD FOR INITIATING POWER GENERATION FOR HYBRID ELECTRIC AUTOMOBILE

BACKGROUND OF THE INVENTION

The present invention relates to a hybrid electric automobile including an electric motor for driving the vehicle and an internal-combustion engine for generating electric power. This invention is particularly concerned with a power generation control apparatus that causes the internal-combustion engine to drive the generator for power generation to prevent reduction in the output of the motor, and also concerned with a control method used therein.

A hybrid electric automobile is driven by an electric motor as a running drive source that uses a battery as a power supply. The battery is charged by a generator that is operated by an internal-combustion engine, to enable the electric motor to provide enough output. The hybrid electric automobile is generally placed in one of two operating states, i.e., a first state in which the motor is driven solely by the battery and a second state in which the generator is operated by the engine to charge the battery while the vehicle runs with electric power supplied from the generator to the motor. The vehicle is normally driven by the motor that is driven solely by the battery, and the generator is operated or energized to charge the battery when the charge capacity of the battery becomes equal to or lower than a predetermined value. Thus, the hybrid electric automobile maintains intended performance.

In a known power generation control apparatus of the hybrid electric automobile, the battery is charged by the generator based on the charge capacity, so that the output of the motor is maintained at such a level that assures the intended power performance. When battery temperature is low, or when the batter is deteriorated, however, the output of the battery decreases even when the charge capacity is higher than the predetermined value. When the battery output decreases, the output of the motor decreases, resulting in deterioration of the power performance as represented by vehicle acceleration and speed, for example.

The engine adapted to energize the generator is equipped with a catalytic purifying device for purifying exhaust gas. A catalyst used in the catalytic purifying device is desirably heated to a predetermined temperature prior to the operation of the engine to assure high capability of purifying or treating the exhaust gas. It is also desirable that the engine runs at idle settings for a certain period of time to perform a warm-up operation to assure high exhaust-gas purifying capability. In the known power generation control apparatus of the hybrid electric automobile, however, power generation is initiated immediately after the charge capacity of the battery goes below the predetermined value, without taking the catalyst temperature of the catalytic purifying device and the warm-up condition of the engine into account.

OBJECT AND SUMMARY OF THE INVENTION

It is therefore an object of the present invention to provide a power generation control apparatus in which a generator is energized by an internal-combustion engine to effect power generation to prevent reduction in the output of an electric motor, and a control method used therein.

The above object may be accomplished according to a principle of the present invention, which provides a power generation control apparatus of a hybrid electric automobile, comprising: an electric motor for driving driving wheels of the hybrid electric automobile; a power supply device for supplying electric power to the electric motor; a generator for supplying electric power to at least one of the electric motor and the power supply device, the generator being driven by an internal-combustion engine; an operating condition detecting unit for detecting an operating condition of the hybrid an electric automobile; electric motor control unit for obtaining a required output of the electric motor based on the operating condition, and supplying the electric motor with electric power corresponding to the required output; an actual output detecting unit for detecting an actual output generated by the electric motor; a required minimum output value setting unit for setting a minimum output which the electric motor is required to generate; and a power generation control unit for controlling power generation by the generator, based on the actual output and the required minimum output value.

The method for controlling power generation according to the present invention includes the following steps: detecting an operating condition of the hybrid electric automobile; obtaining a required output of the electric motor based on the operating condition; supplying the electric motor with the electric power corresponding to the required output; detecting an actual output generated by the electric motor; setting a required minimum output value representing a minimum output which the motor is required to generate; and controlling power generation by the generator based on the actual output and the required minimum output value.

In the power generation control apparatus and the control method according to the present invention, power generation can be surely carried out before the output of the electric motor is lowered, assuring sufficiently high power performance of the hybrid electric automobile.

DETAILED DESCRIPTION OF THE PREFERRED EMBODIMENTS

Figure 1:
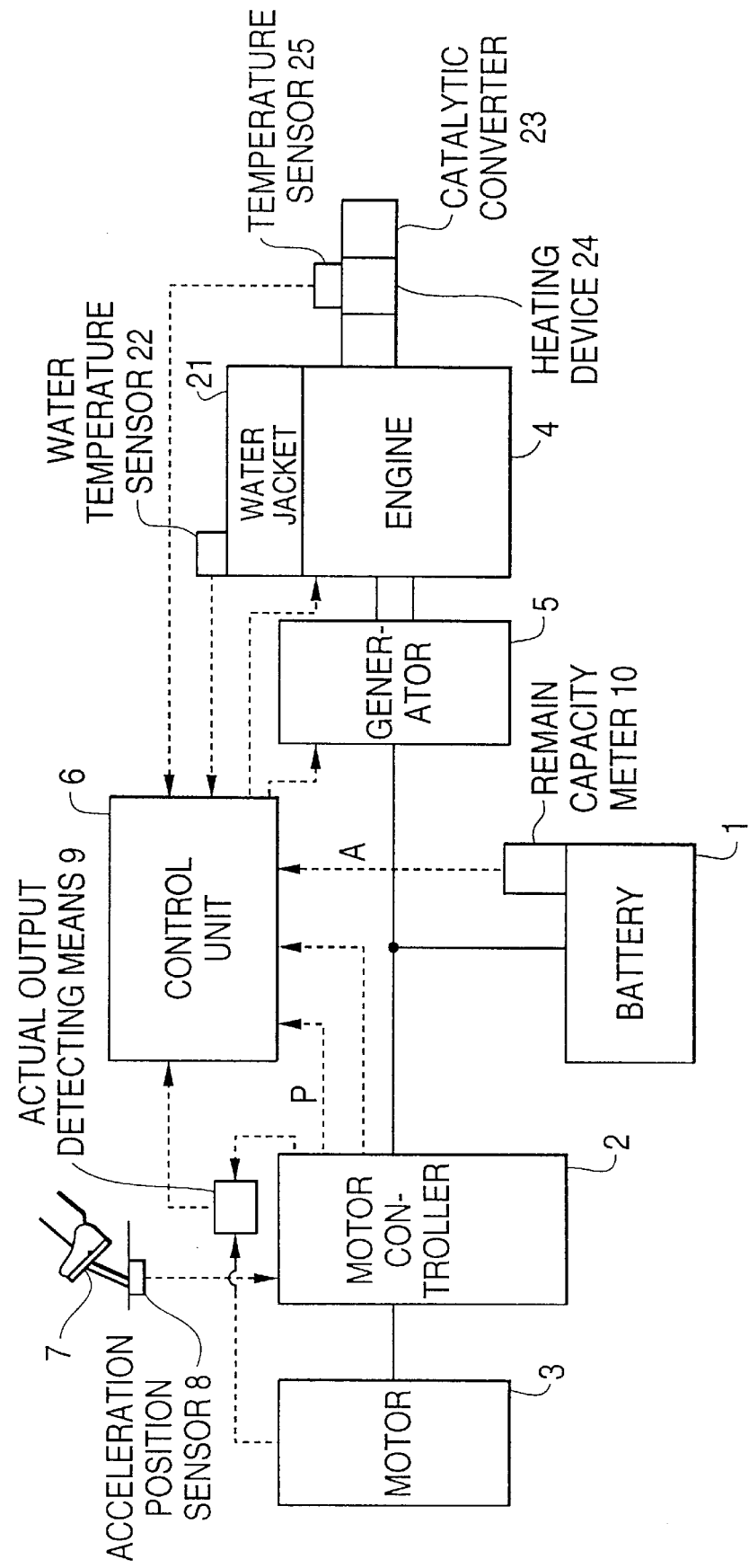
FIG. 1 is a view schematically showing the construction of a hybrid electric automobile equipped with a power generation control apparatus according to the first embodiment of the present invention.

Referring first to FIG. 1, a power supply device in the form of a battery 1, which is installed in a hybrid electric automobile, is electrically connected to an electric motor in the form of a motor 3. The motor 3 is connected to driving wheels of the vehicle (not shown), so that the hybrid electric automobile runs by driving force of the motor 3. An internal-combustion engine assembly, which is also installed in the hybrid electric automobile, consists principally of an engine 4, radiator, and catalytic converter 23. The output shaft of the engine 4 is connected to a generator 5 for supplying electric power to the battery 1 and the motor 3. The generator 5 is driven by the engine 4 to charge the battery 1. The operations of the engine 4 and generator 5 are controlled based on commands received from a control unit 6.

In the meantime, an accelerator pedal 7 is equipped with a accelerator position sensor 8 serving as means for detecting a vehicle operating condition, which generates an output signal representing an accelerator pedal depression amount, i.e., an amount by which the accelerator pedal 7 is depressed by a driver. The output signals of this sensor 8 are fed to a motor controller 2 and the control unit 6. The motor controller 2 sets a directive output signal (command) to be fed to the motor 3, and the motor 3 is driven according to the directive output signal thus received. Further, actual output detecting means 9 is provided for detecting the running speed of the motor 3 and a value of current supplied from the motor controller 2 to the motor 3 to calculate an actual output of the motor 3 based on the motor speed and current value. The control unit 6 receives the actual output of the motor 3 detected by this actual output detecting means 9, as well as the directive output signal (command) for driving the motor 3. The above-mentioned battery 1 is provided with a remaining capacity meter 10 for detecting a remaining capacity of the battery 1, and detected information of the remaining capacity meter 10 is sent to the control unit 6.

The engine 4 is equipped with a water-temperature sensor 22 for detecting the temperature of cooling water contained in a water jacket 21. Further, the engine 4, as the internal-combustion engine, has an exhaust system including the catalytic converter 23. A catalyst of the catalytic converter 23 is heated by a heating device 24, such as an electric heater, to a temperature to be detected by a temperature sensor 25. The control unit 6 receives the information related to the water temperature from the water-temperature sensor 22, and the information related to heating of the catalyst from the temperature sensor 25 to determine the temperature of the catalyst and a warm-up condition of the engine 4.

Figure 2:
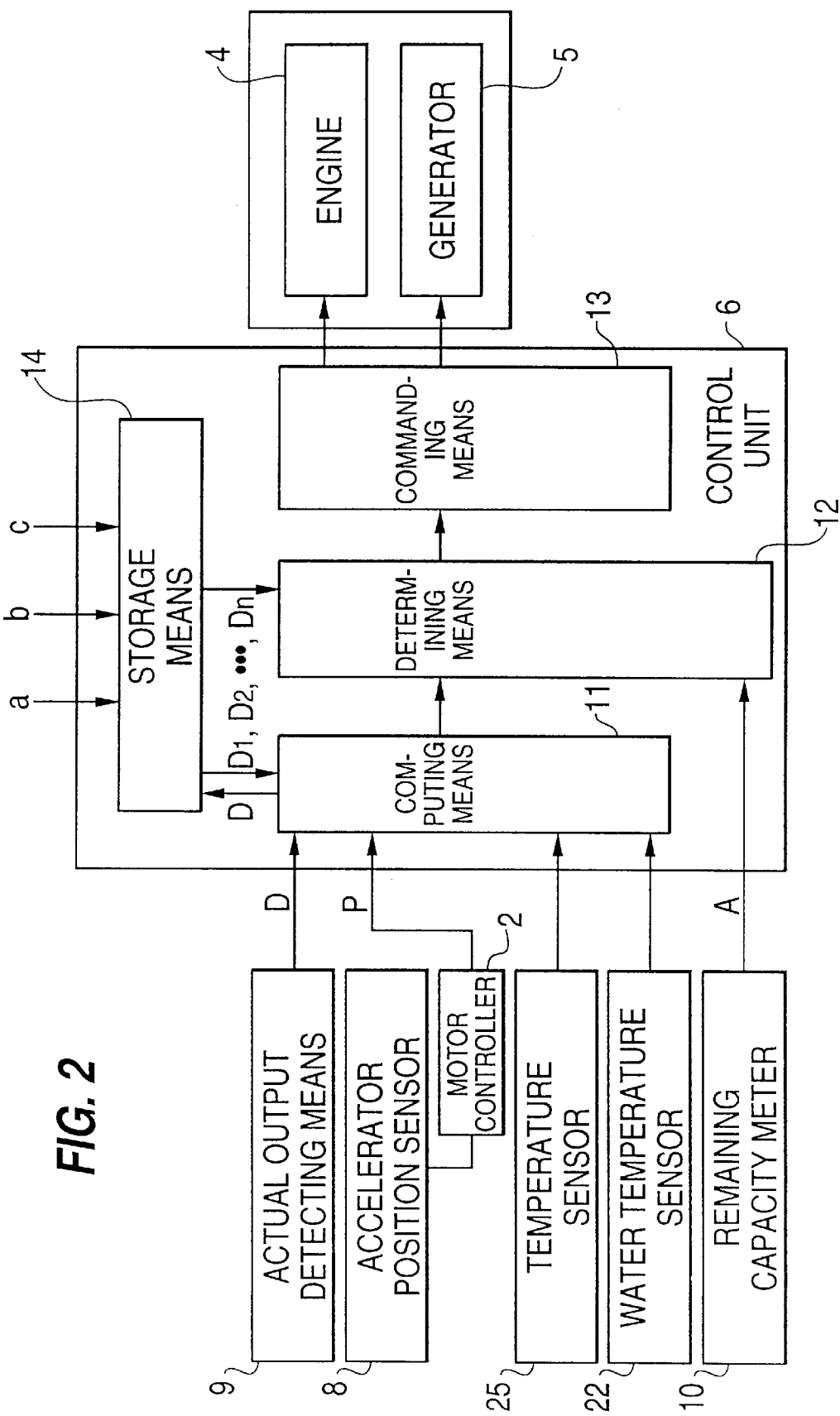
FIG. 2 is a block diagram showing a control unit of the first embodiment of FIG. 1.

As shown in FIG. 2, the control unit 6 includes computing means 11, determining means 12 and commanding means 13. The computing means 11 receives the detected information of the actual output detecting means 9, and the output signal of the accelerator position sensor 8. The computing means 11 further receives the information related to the water temperature of the cooling water detected by the water-temperature sensor 22, and the information related to heating of the catalyst detected by the temperature sensor 25. The determining means 12 receives the information detected by the remaining capacity meter 10, and results of operations performed by the computing means 11. The control unit 6 further includes storage means 14, in which are stored various kinds of predetermined values, and the information computed by the computing means 11. The information stored in the storage means 14 is fed to the determining means 12 where the results of operations are compared with the stored information. The information regarding results of determination in the determining means 12 is then fed to the commanding means 13. The commanding means 13 generates operating commands to the engine 4 and the generator 5 based on the determination of the determining means 12.

More specifically, the determining means 12 receives a charge-capacity "A" of the battery 1 based on the information detected by the remaining capacity meter 10. The storage means 14 preliminarily stores a predetermined lower limit "a" of the remaining electric capacity of the battery 1, and the determining means 12 compares the charge capacity "A" with the predetermined value "a" stored in the storage means 14, to determine whether the battery 1 has a sufficiently large remaining capacity or not.

The drive force required for driving the vehicle is calculated based on the output signal of the accelerator position sensor 8. The required drive force, thus obtained, is fed to the motor controller 2 where a desired output level, namely, required output "P" of the motor 3 is calculated. The motor controller 2 then supplies appropriate electric power to the motor 3 based on the required output "P". This required output "P" is also sent to the computing means 11. In the meantime, the computing means 11 receives the actual output "D" of the motor 3 that is detected by the actual output detecting means 9, and calculates the ratio "B" of the actual output "D" to the required output "P" (B=D/P). The storage means 14 preliminarily stores a predetermined value (predetermined ratio "b") of the ratio "B" of the actual output "D" to the required output "P" of the motor 3, and the determining means 12 compares the ratio "B" with the predetermined ratio "b", to determine whether the motor 3 is currently generating the output that corresponds to the amount by which the accelerator pedal 17 is depressed by the driver.

Figure 5:
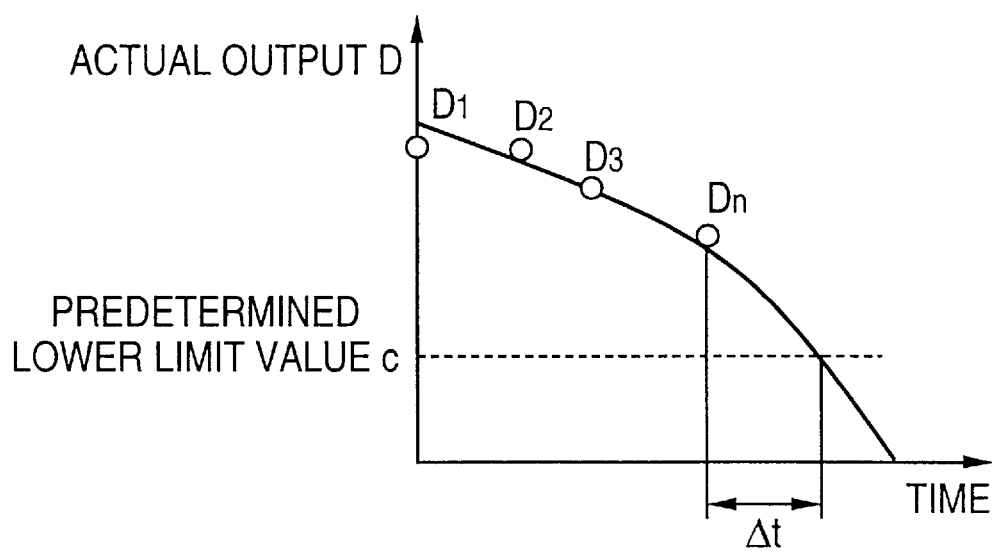
FIG. 5 is a graph indicating the relationship of an output of an electric motor of the first embodiment with respect to a time that has elapsed.

The storage means 14 further stores the predetermined lower limit value (required minimum output value) "c" that is the lower limit of the actual output D of the motor 3. On the other hand, the actual output value D used in the operation of the computing means 11 for obtaining the ratio "B" (actual output "D"/required output "P") is stored in the stored means 14, such that a plurality of latest values (at least three values D1, D2, D3, . . . , Dn) of the actual output D are stored while being updated. The series of actual output values D (D1, D2, D3, . . . , Dn) thus updated are received by the computing means 11 where a parameter is obtained by least square approximation for minimizing the sum of squares of differences between these actual output values D. On the basis of this parameter, the computing means 11 calculates a time $\Delta t$ (limit time) for the actual output D to reach the predetermined lower limit value "c". As shown in FIG. 5, the period $\Delta t$ from the time when the latest actual output Dn is detected to the time when the output value D reaches the predetermined lower limit "c" is estimated based on the parameter obtained by least square approximation.

The computing means 11 receives the temperature of the catalyst detected by the temperature sensor 25, and the water temperature of the radiator 21 detected by the water-temperature sensor 22, and calculates a pre-start time $d_3$, which is required for the engine 4 to reach a state that allows the engine 4 to drive the generator 5, based on the catalyst temperature and the water temperature. Namely, it is desirable to heat the catalyst in advance before starting an operation of the engine 4, and place the engine 4 in a warm-up condition before the generator 5 is driven, in view of exhaust gas characteristics of the engine 4, i.e., its capability of purifying or treating the exhaust gas. To this end, the heating time $d_1$, required for the catalytic converter 23 to effectively operate, is calculated based on the current catalyst temperature, and the time $d_2$, required to place the engine 4 in the warm-up condition, is calculated based on the current temperature of the radiator 21. The above-indicated pre-start time $d_3$ is then calculated by adding the heating time $d_1$ of the catalytic converter 23 and the time $d_2$ (warm-up time) required to warm up the engine 4.

In the present embodiment, the accelerator position sensor 8 that directly reflects the driver's intention is illustrated as an example of operating condition detecting means. However, in the case of a motor vehicle wherein the output of the motor 3 is controlled to keep the output of the vehicle constant irrespective of the depression amount of the accelerator pedal 7 while the vehicle is running on an uphill road, for example, the operating condition may be determined based on the information or command outputted to the motor 3, namely, based on the information of running condition detecting means for detecting a running condition of the vehicle. Further, the current operating state of the engine 4 may be detected by parameters other than the water temperature of the radiator 21 and the catalyst temperature of the catalytic converter 23. For example, the time that elapses from starting of the engine may be measured, or the condition of the exhaust gas may be directly detected to detect the current operating state of the engine 4.

Figure 3:
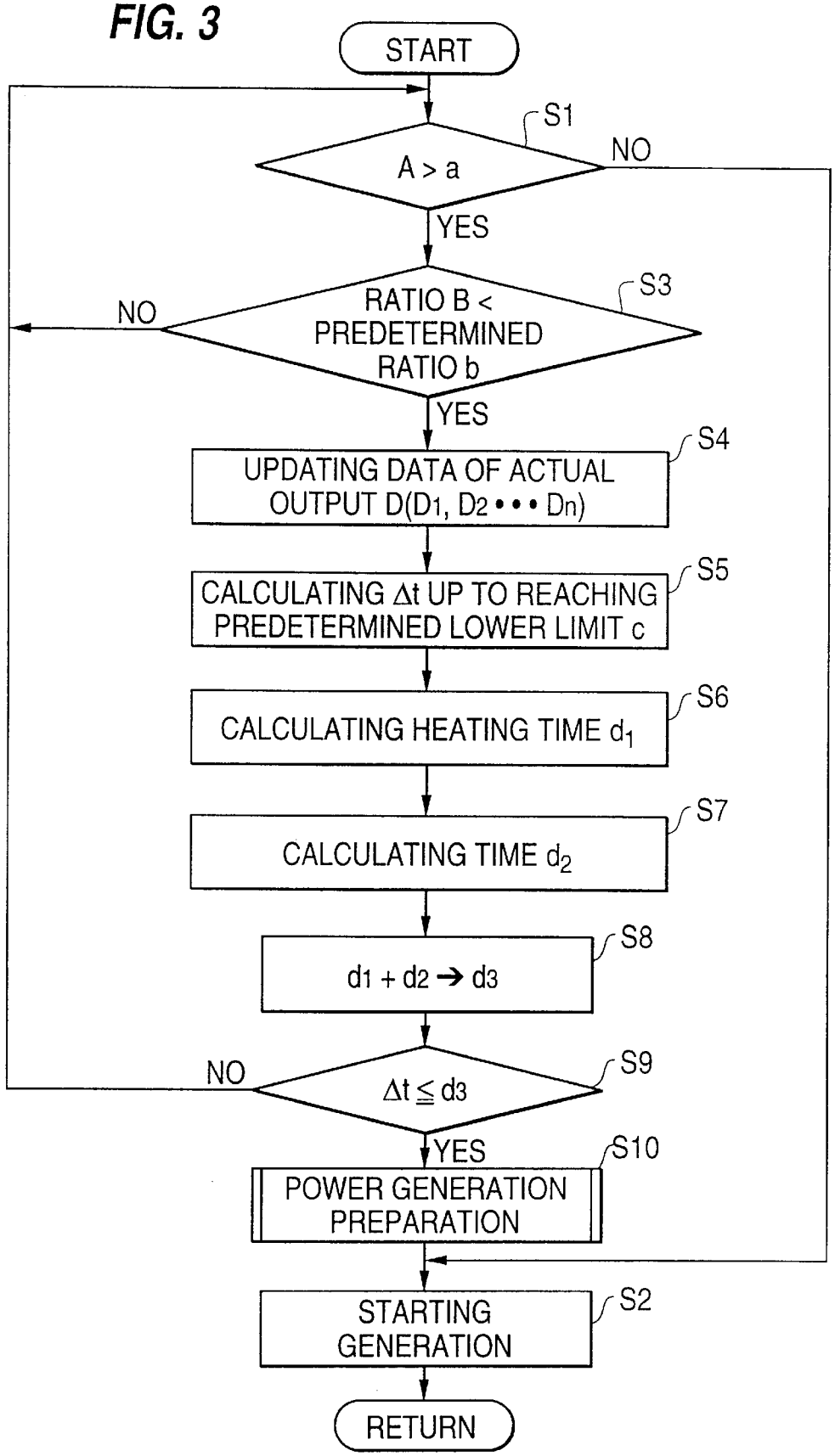
FIG. 3 is a flow chart of processing for controlling initiation of power generation according to the first embodiment.
Figure 4:
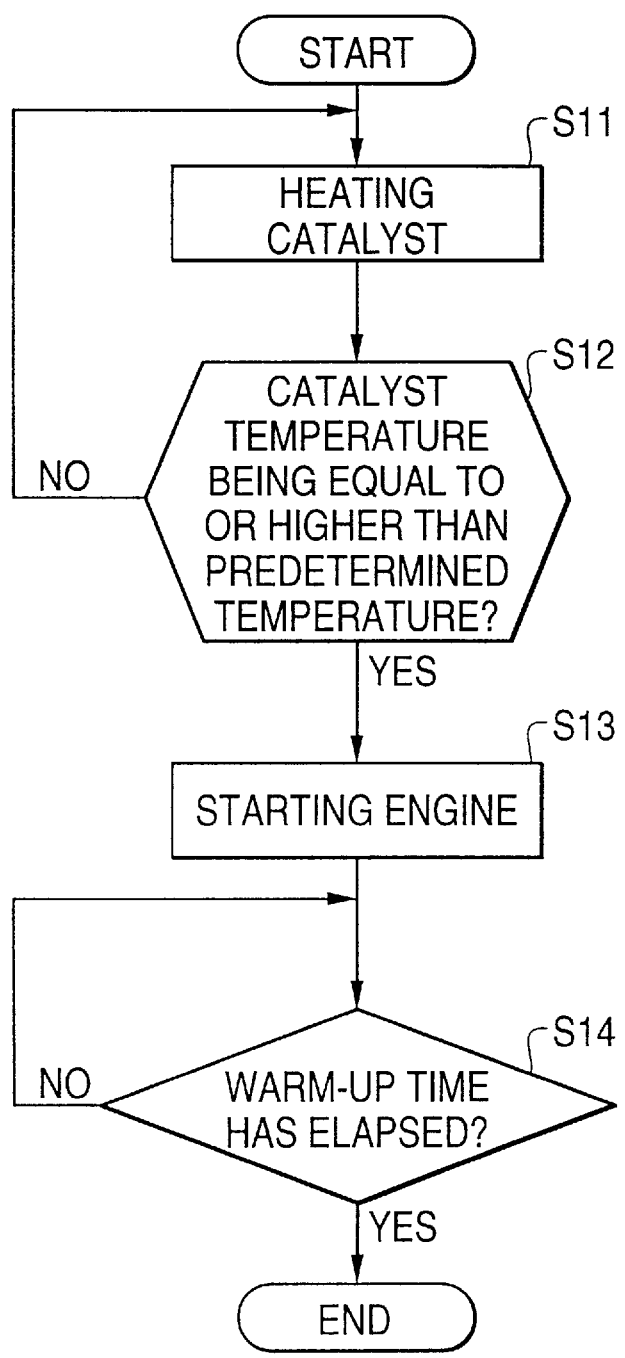
FIG. 4 is a flow chart of processing for controlling preparation of power generation according to the first embodiment.

Referring next to FIGS. 3 to 5, there will be now described the content of the processing for starting power generation in the hybrid electric automobile.

In the first step S1, the determining means 12 of the control unit 6 determines whether the charge capacity "A" of the battery 1 exceeds the predetermined value "a" or not. If it is determined that the charge capacity "A" of the battery 1 is equal to or lower than the predetermined value "a", the control flow goes to step S2. In step S2, operating commands are generated to the engine 4 and generator 5 based on various conditions, and power generation is initiated by controlling energizing current, for example, to charge the battery 1.

If it is determined in step S1 that the charge capacity "A" of the battery 1 exceeds the predetermined value "a", the control flow goes to step S3 to compare the ratio "B" with the predetermined ratio "b". Namely, it is determined whether the ratio B (actual output "D"/ required output "P") calculated by the computing means 11 is smaller than the predetermined ratio "b" stored in advance in the storage means 14. If it is determined that the ratio "B" is smaller than the predetermined ratio "b", which means that the output of the motor 3 is less than the output required by the driver, the control flow goes to step S4 to effect the processing (to calculate the limit time) that leads to starting of the power generation. If it is determined in step S3 that the ratio B is larger than the predetermined ratio b, which means that the output of the motor 3 approximately matches the required output, the control flow returns to step S1 without effecting the processing that leads to starting of the power generation.

In step S4, data representing a plurality of actual outputs D ($D_1$, $D_2$, $D_3$, . . . , Dn) that have been used for calculating the ratio B and are stored in the storage means 14 are updated. In step S5, the parameter is obtained by least square approximation (refer to FIG. 5) based on the updated data of the actual outputs, and the period of time $\Delta t$ (limit time) from the current point of time when the latest actual output Dn of the motor 3 is detected until the actual output D of the motor 3 reaches the predetermined lower limit value "c" is calculated based on the parameter obtained by least square approximation (refer to FIG. 5).

After the time $\Delta t$ is calculated in step S5, step S6 is executed to calculate the heating time $d_1$ required for the catalytic converter 23 to effectively operate, on the basis of the current catalyst temperature. Step S7 is then executed to calculate the time $d_2$ required to warm up the engine 4, on the basis of the current temperature of the cooling water. Thereafter, step S8 is executed to add the heating time $d_1$ of the catalytic converter 23 and the time $d_2$ required to warm up the engine 4, to obtain the pre-start time $d_3$ required for the engine 4 to start effectively operating, namely, the operating time of the engine 4 up to driving of the generator 5.

After the pre-start time $d_3$ is calculated, step S9 is executed to compare the limit time $\Delta t$ it takes the actual output D to reach the predetermined lower limit value "c", with the pre-start time $d_3$ it takes the engine 4 to start effectively operating. If the result of the comparison indicates that the time $\Delta t$ is equal to or shorter than the pre-start time $d_3$, the catalyst is heated and the engine 4 is warmed up (i.e., the internal-combustion engine assembly is operated). Step S10 is then executed to implement a power generation preparation routine, and the power generation is initiated in step S2 to charge the battery 1. If it is determined in step S9 that the time $\Delta t$ is longer than the pre-start time $d_3$, namely, that the time $\Delta t$ is long enough though the output of the motor 3 is less than the output required by the driver, the control flow returns to step S1.

When the time ($\Delta t$ as the limit time) for the actual output D of the motor 3 to reach the predetermined lower limit value "c" becomes equal to or shorter than the time (pre-start time $d_3$) for the engine 4 to reach the state where the generator 5 can be driven, the control flow proceeds to step S10 to implement the power generation preparation routine in which the catalyst is heated and the engine 4 is warmed up, and the battery 1 is then charged.

Turning to FIG. 4, there will be explained the content of the power generation preparation routine. Initially, step S11 is executed to start heating the catalyst of the catalytic converter 23 in response to a command from the control unit 6 for preparing power generation. The catalytic converter 23 includes an electric heating device 24 that operates independently of the operation of the engine 4, and the catalyst is heated by this heating device 24. In the next step S12, it is determined whether the temperature of the catalyst is equal to or higher than a predetermined level. The detection of the catalyst temperature continues until the catalyst is heated to the predetermined temperature or higher. When it is determined that the catalyst temperature becomes equal to or higher than the predetermined level, step S13 is executed to start the engine 4.

After the engine 4 is started in step S13, it is determined in step S14 whether the warm-up time d2, which was calculated in step S7, has elapsed or not. The detection of the warm-up time continues until the warm-up time d2 elapses, and, when it is determined that the warm-up time d2 has elapsed, the control flow returns to the main processing (FIG. 3) so that the power generation is initiated in step S2.

Figure 6:
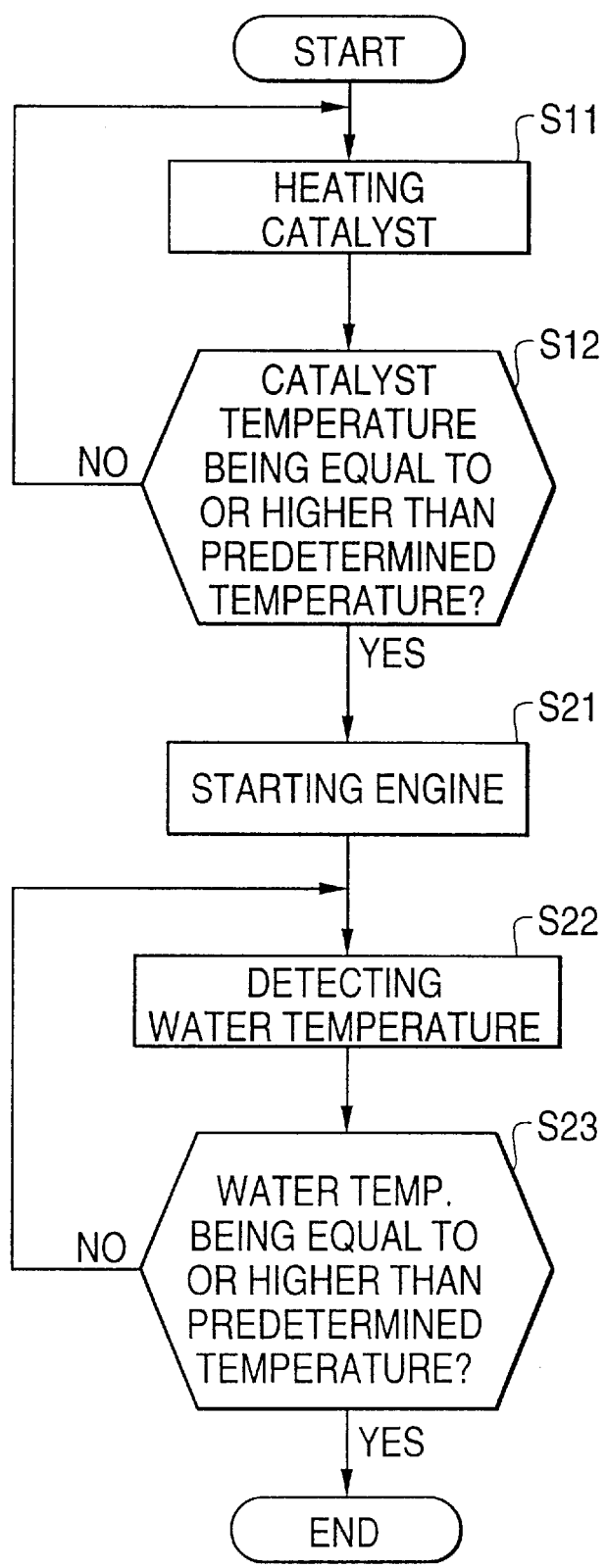
FIG. 6 is a flow chart of control of preparation of power generation according to the second embodiment of the invention.

Referring to FIG. 6, there will be described another power generation initiating routine according to a second embodiment of the present invention. Similarly to the first embodiment shown in FIG. 4, step S11 is executed to start heating the catalyst of the catalytic converter 23, and step S12 is then executed to determine whether the temperature of the catalyst is equal to or higher than a predetermined level. If it is determined that the catalyst temperature is equal to or higher than the predetermined level, step S21 is executed to start the engine 4. Thereafter, the temperature of the cooling water is detected in step S22. The detection of the water temperature continues in step S23 until the temperature of the cooling water becomes equal to or higher than the predetermined level. It is determined that the engine 4 has been warmed up enough if the water temperature becomes equal to or higher than the predetermined level. When the engine 4 is placed in the warm-up condition, the control flow returns to the main processing of FIG. 3, to initiate power generation in step S2. Thus, in the present embodiment, the warm-up condition of the engine 4 is determined based on the temperature of the cooling water.

In the power generation control apparatus as described above, the power generation is initiated immediately after the charge capacity "A" of the battery 1 becomes equal to or lower than the predetermined value "a" to prevent reduction in the output of the motor 3.

In the hybrid electric automobile according to the illustrated embodiments, when the time Δt, as the limit time for the actual output "D" of the motor 3 to reach the predetermined lower limit value "c," becomes equal to or shorter than the pre-start time $d_3$, heating of the catalytic converter 23 and warming-up of the engine 4 are effected, so that the battery 1 is charged after the catalyst is heated and the engine 4 is warmed up. Thus, the battery 1 can be efficiently charged, and the reduction in the output of the motor 3 can be prevented without deteriorating the exhaust gas characteristics. This makes it possible to practice power generation so as to bring the motor 3 to a state where no reduction of the output occurs, without deteriorating the exhaust gas characteristics, thereby eliminating the possibility of deterioration of the performance of the hybrid electric automobile.

In the hybrid electric automobile according to the illustrated embodiments of the invention, the power generation is initiated to charge the battery 1 even if the charge capacity "A" of the battery 1 exceeds the predetermined value "a", when the ratio "B" of the actual output D of the motor to the required output P corresponding to the amount of depression of the accelerator pedal 7 is smaller than the predetermined ratio "b", namely, when the output of the motor 3 is less than the output required by the driver. Therefore, in the case where the battery 1 temperature is low, or the battery is deteriorated, the power generation is initiated to charge the battery 1 even if the charge capacity "A" of the battery 1 is sufficiently high, so as to surely avoid reduction of the output of the motor 3. Thus, the power generation can be practiced to bring the motor 3 to the state where no reduction of its output occurs, and the power performance of the hybrid electric automobile can be therefore maintained at a sufficiently high level.

While the actual output of the motor is compared with the output required by the driver by comparing the ratio "B" (actual output "D"/required output "P") of the actual output "D" to the required output "P" with the predetermined ratio "b" in the illustrated embodiment, the actual output "D" may be directly compared with the required output "P" by performing an appropriate operation.

Figure 9:
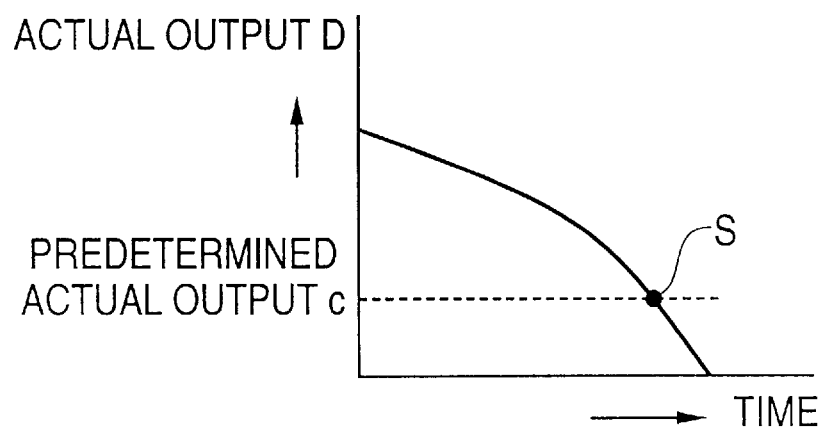
FIG. 9 is a graph indicating the relationship of an output of an electric motor of the third embodiment with respect to a time that has elapsed.
Figure 7:
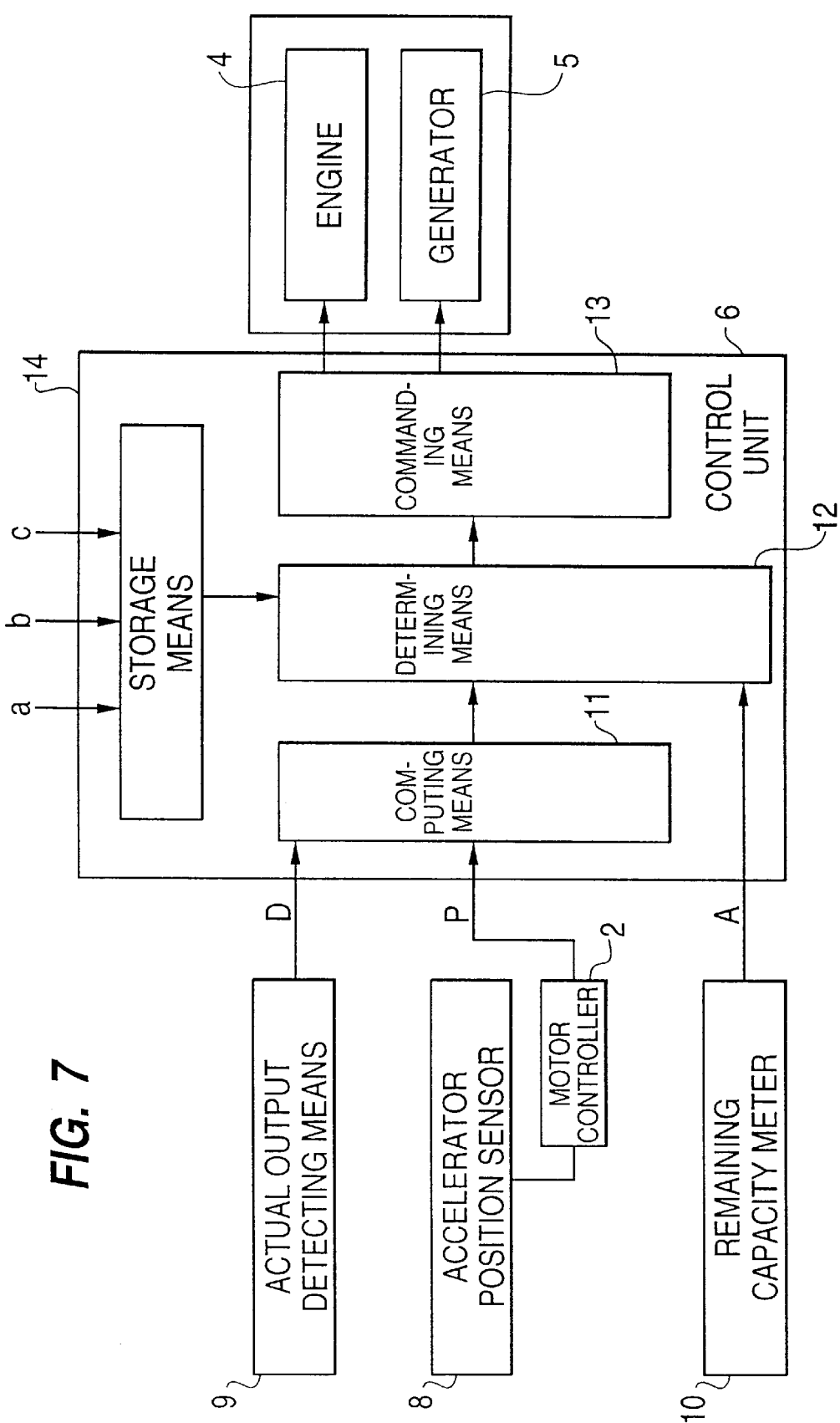
FIG. 7 is a block diagram showing a control unit of the third embodiment of the present invention.
Figure 8:
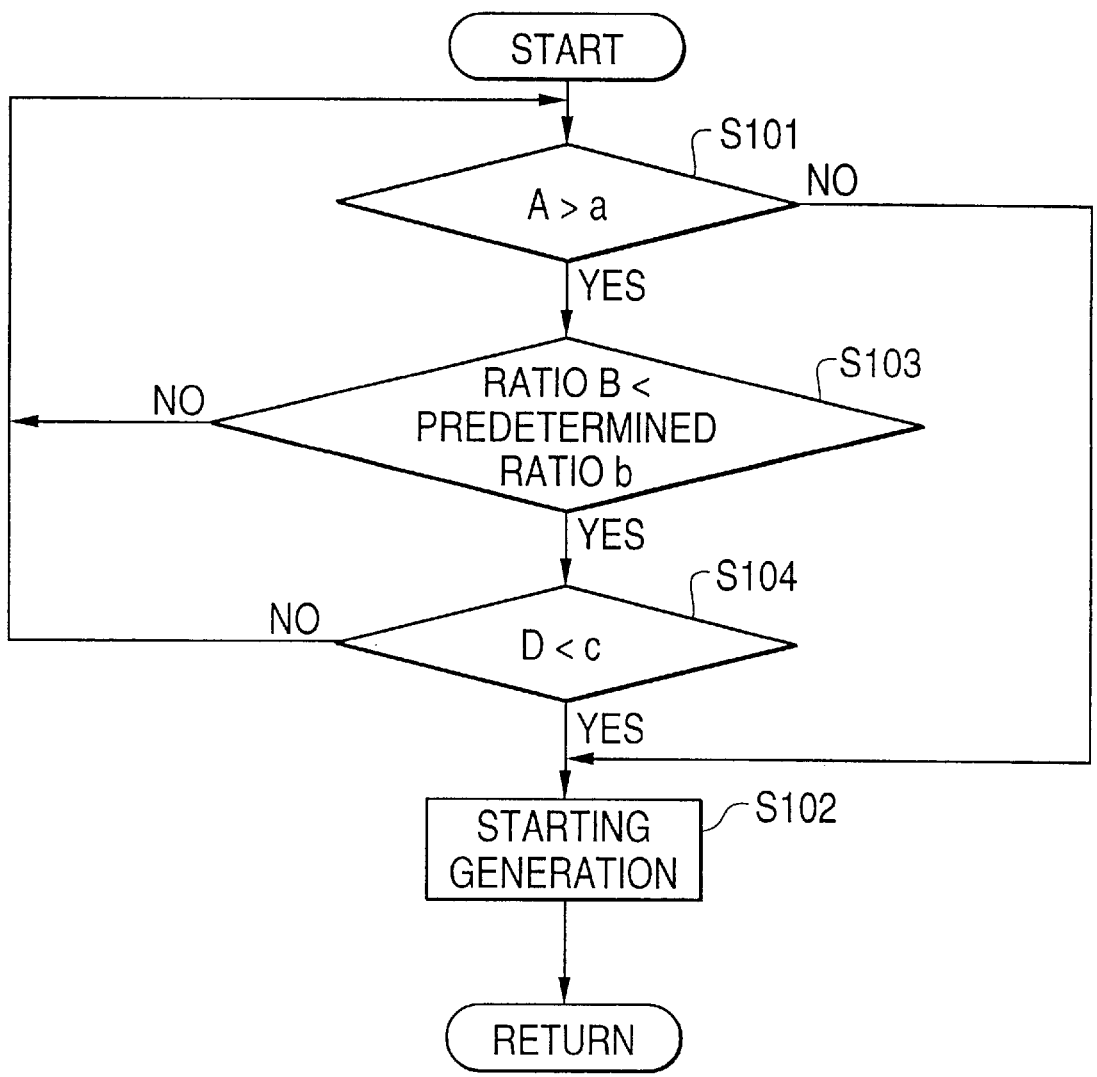
FIG. 8 is a flow chart of processing for controlling initiation of power generation according to the third embodiment.

Referring next to FIGS. 7–9, there will be explained a third embodiment of the power generation control apparatus of the present invention. The construction of a hybrid electric automobile including the power generation control apparatus of the present embodiment is schematically illustrated in FIG. 1 showing the first embodiment, and therefore will not be described in detail.

As shown in FIG. 7, the control unit 6 includes computing means 11, determining means 12 and commanding means 13. The computing means 11 receives detected information of the actual output detecting means 9, and output signals from the accelerator position sensor 8. The determining means 12 receives detected information of the remaining capacity meter 10, and results of operations performed by the computing means 11. The control unit 6 includes storage means 14 in which various kinds of predetermined values are stored. The determining means 12 receives stored information of the storage means 14, and makes a determination by comparing the results of operations with the stored information. The commanding means 13 receives the result of determination of the determining means 12, and outputs operating commands to the engine 4 and generator 5 based on the input information.

More specifically, the determining means 12 receives the charge capacity "A" of the battery 1 based on the detected information of the remaining capacity meter 10. The storage means 14 preliminarily stores a lower limit value (predetermined value) "a" of the remaining electric capacity of the battery 1, and compares the predetermined value "a" stored in the storage means 14 with the current charge capacity "A", and determines whether the battery 1 has a sufficient remaining capacity or not.

The required output P, which is an acceleration or speed at which the vehicle is required to run, is calculated by the motor controller 2 on the basis of the information of the output signal of the accelerator position sensor 8, and is sent to the computing means 11. The computing means 11 also receives the actual output D of the motor 3 based on the detected information of the actual output detecting means 9, and then computes the ratio B of the actual output "D" to the required output "P" (B=D/P). The storage means 14 preliminarily stores a predetermined value (predetermined ratio "b") of the ratio B of the actual output D to the required output P of the motor 3, and the determining means 12 compares the ratio "B" with the predetermined ratio "b". It is thus determined whether the motor 3 is generating an output that corresponds to the amount by which the accelerator pedal 7 is depressed by the driver.

The storage means 14 stores the predetermined lower limit value (predetermined actual output value) of the actual output "D" of the motor 3, and the determining means 12 compares the actual output "D" of the motor 3 with the predetermined actual output value "c", to determine whether the actual output "D" of the motor 3 has reached the lower limit.

In the present embodiment, the accelerator position sensor 8 that directly reflects the driver's intention is illustrated as an example of operating condition detecting means. However, in the case of a motor vehicle wherein the output of the motor 3 is controlled to keep the output of the vehicle constant irrespective of the depression amount of the accelerator pedal 7 while the vehicle is running on an uphill road, for example, the operating condition may be determined based on the information or commands received by the motor 3, namely, based on the information of running condition detecting means for detecting a running condition of the vehicle. Further, the maximum amount of power generated by the generator 5 should be smaller than the permissible maximum input of the motor 3.

Referring next to FIGS. 8 and 9, the processing for initiating power generation by the above-described power generation control apparatus will be explained.

As shown in FIG. 8, step S101 is executed to determine whether the charge capacity "A" of the battery 1 exceeds the predetermined value "a" or not. If it is determined that the charge capacity "A" of the battery 1 is equal to or lower than the predetermined value "a", the control flow directly goes to step S102. In step S102, operating commands are outputted to the engine 4 and generator 5 based on various conditions, and power generation is initiated by controlling energizing current, for example, to carry out charging of the battery 1.

If it is determined that the charge capacity "A" of the battery 1 exceeds the predetermined value "a" in step S101, the control flow goes to step S103 to compare the ratio "B" with the predetermined ratio "b". Namely, it is determined whether the ratio "B" of the actual output "D" to the required output "P" (actual output "D"/required output "P"), which is calculated by the computing means 11, is smaller than the predetermined ratio "b" preliminarily stored in the storage means 14. If it is determined that the ratio "B" is smaller than the predetermined ratio "b", which means that the output of the motor 3 is insufficient with respect to the output required by the driver, the control flow goes to step S104 to implement processing that leads to starting of the power generation. If it is determined that the ratio "B" is larger than the predetermined ratio "b" in step S103, which means that the motor 3 is generating an output that approximately matches the output required by the driver, the control flow returns to step S101 without implementing the processing that leads to starting of the power generation.

In step S104, it is determined whether the actual output "D" of the motor 3 is lower than the predetermined actual output value "c". Namely, the actual output D of the motor 3 decreases with a lapse of time while the automobile is running, as shown in FIG. 9, and it is determined whether the current actual output "D" of the motor 3 becomes lower than the predetermined actual output value "c" as the predetermined lower limit value. If it is determined in step 104 that the actual output "D" is lower than the predetermined actual output value "c", namely, if the actual output D becomes lower than "S" point shown in FIG. 9, the control flow goes to step S102 to generate operating commands to the engine 4 and generator 5 to initiate power generation to charge the battery 1.

In the power generation control apparatus as described above, the power generation is immediately initiated to charge the battery 1 when the charge capacity "A" of the battery 1 becomes equal to or lower than the predetermined value "a". In this manner, the output of the motor 3 is prevented from being lowered. Further, even if the charge capacity "A" of the battery 1 is larger than the predetermined value "a", the present power generation control apparatus is adapted to charge the battery 1 if the ratio "B" of the actual output "D" of the motor 3 to the required output "P" corresponding to the depression amount of the accelerator pedal 7 is smaller than the predetermined ratio "b", and the actual output "D" is smaller than the predetermined lower limit value. Thus, the reduction of the output of the motor 3 can be efficiently avoided. Consequently, the power generation can be practiced to bring the motor 3 to the state where no reduction of the output occurs, thus eliminating the possibility of reduction in the power performance of the hybrid electric automobile.

While the comparison between the actual output of the motor 3 and the output required by the driver is effected by comparing the ratio "B" of the actual output "D" to the required output "P" (B=D/P) with the predetermined ratio "b", the actual output "D" may be directly compared with the required output "P" by performing an appropriate operation. Further, step S104 for determining whether the actual output "D" is lower than the predetermined lower limit value may be omitted, and the power generation can be immediately initiated to charge the battery 1 when the actual output of the motor 3 is determined to be insufficient with respect to the output required by the driver.

In the power generation control apparatus of the hybrid electric automobile of the present embodiment, since the operation of the generator is controlled based on the predetermined lower limit value (required minimum output value) and the actual output of the electric motor, the power generation can be initiated when the actual output of the electric motor is found insufficient with respect to the current vehicle operating condition. Therefore, when the temperature of the power supply device is low or the power supply device is deteriorated, the power supply device can be charged before its charge capacity becomes lower than the predetermined value. Consequently, the electric motor does not suffer from reduction in the output thereof, thereby avoiding reduction in the power performance of the hybrid electric automobile.

Although the invention has been described in detail with respect to a preferred embodiment thereof, it will be apparent to those skilled in the art that various modifications are possible without departing from the scope of the present invention.

What is claimed is:

1. A power generation control apparatus of a hybrid electric automobile, comprising:

an electric motor for driving driving wheels of said hybrid electric automobile;

a power supply device for supplying electric power to said electric motor;

a generator for supplying electric power to at least one of said electric motor and said power supply device, said generator being driven by an internal-combustion engine;

operating condition detecting means for detecting an operating condition of said hybrid electric automobile;

electric motor control means for obtaining a required output of said electric motor based on said operating condition, and supplying said electric motor with electric power corresponding to said required output;

actual output detecting means for detecting an actual output generated by said electric motor;

required minimum output value setting means for setting a minimum output which said electric motor is required to generate;

remaining capacity detecting means for detecting remaining capacity of said power supply device;

comparing means for comparing said detected remaining capacity with a predetermined threshold value; and power generation control means for controlling power generation by said generator, based on said actual output and said required minimum output value, when said detected remaining capacity is greater than said predetermined threshold value.

2. A power generation control apparatus according to claim 1, wherein said power generation control means includes, first time computing means for computing a first time based on said operating condition of the hybrid electric automobile detected by said operating condition detecting means, and said actual output of said electric motor detected by said actual output detecting means, said first time representing a period of time it takes the actual output to be lowered down to said required minimum output value, second time computing means for computing a second time based on a current condition of said internal-combustion engine, said second time representing a period of time it takes the internal-combustion engine to reach an operating state that allows the internal-combustion engine to drive said generator, and power generation preparing means for initiating preparation of power generation by said generator when said first time is found to be not longer than said second time.

3. A power generation control apparatus according to claim 2, wherein said preparation of power generation includes warming-up of said internal-combustion engine.

4. A power generation control apparatus according to claim 2, wherein said preparation of power generation includes heating of a catalyst provided in said internal-combustion engine.

5. A power generation control apparatus according to claim 2, wherein said power generation preparing means delays driving of said generator by said internal-combustion engine until the internal-combustion engine reaches an operating state that allows the internal-combustion engine to drive the generator.

6. A power generation control apparatus according to claim 5, wherein said operating state that allows the internal-combustion engine to drive the generator includes a state where warming-up of the internal-combustion engine has been completed.

7. A power generation control apparatus according to claim 6, wherein said operating state that allow the internal-combustion engine to drive the generator includes a state where heating of a catalyst provided in said internal-combustion engine has been completed.

8. A power generation control apparatus according to claim 2, wherein said preparation of power generation is inhibited when a ratio of said actual output to said required output is larger than a predetermined value.

9. A power generation control apparatus according to claim 2, wherein said first time computing means approximate squares of differences between a plurality of stored values of said actual output by least square approximation.

10. A power generation control apparatus according to claim 2, wherein said internal-combustion engine has a catalyst for purifying exhaust gas, and said second time includes a heating time required to heat said catalyst to a first predetermined temperature, and a warm-up time required to warm up said internal-combustion engine to a second predetermined temperature.

11. A power generation control apparatus according to claim 1, wherein said power generation control means immediately initiates power generation by said generator when said actual output becomes lower than said required minimum output value.

12. A power generation control apparatus according to claim 11, wherein said power generation control means inhibits power generation by said generator when a ratio of said actual output to said required output is larger than a predetermined value.

13. A power generation control apparatus according to claim 1, wherein said power generation control means immediately initiates power generation by said generator when said charge capacity being lower than said predetermined threshold value.

14. A power generation control apparatus according to claim 1, further comprising:

a motor speed sensor for detecting a running speed of said electric motor; and a motor current sensor for detecting a value of current supplied to said electric motor, and wherein said actual output detecting means computes said actual output based on said running speed of the motor and said value of current supplied to the motor.

15. A method for controlling power generation of a hybrid electric automobile including an electric motor for driving driving wheels, a power supply device for supplying electric power to said electric motor, a generator for supplying electric power to at least one of said electric motor and said power supply device, said generator being driven by said electric motor, comprising:

detecting an operating condition of said hybrid electric automobile;

obtaining a required output of said motor based on said operating condition;

supplying said electric motor with electric power corresponding to said required output;

detecting an actual output generated by said electric motor;

setting a required minimum output value representing a minimum output which said motor is required to generate;

detecting remaining capacity of the power supply device;

comparing said detected remaining capacity with a predetermined threshold value; and controlling power generation by said generator based on said actual output and said required minimum output value, when said detected remaining capacity is greater than said predetermined threshold value.

16. A method according to claim 15, wherein said controlling step includes, computing a first time based on said operating condition of the hybrid electric automobile detected by said operating condition detecting means, and said actual output of said electric motor detected by said actual output detecting means, said first time representing a period of time it takes the actual output to be lowered down to said required minimum output value, computing a second time based on a current condition of said internal-combustion engine, said second time representing a period of time it takes the internal-combustion engine to reaches an operating state that allows the internal-combustion engine to drive said generator, and initiating preparation of power generation by said generator when said first time is found to be not longer than said second time.

17. A method according to claim 15, wherein said controlling step includes, immediately initiating power generation by said generator when said actual output becomes lower than said required minimum output value.

* * * * *

UNITED STATES PATENT AND TRADEMARK OFFICE
CERTIFICATE OF CORRECTION

PATENT NO. : 5,821,706
DATED : October 13, 1998
INVENTOR(S) : Hisamitsu KOGA.

It is certified that error appears in the above-identified patent and that said Letters Patent is hereby corrected as shown below:

Column 10:

Line 62, change "it takes" to --for--;
Line 63, change "be lowered down" to --decease--;

Column 11:

Line 1, change "it takes" to --for--;
Line 6, change "found to be not longer" to --shorter--;
Line 27, change "allow" to --allows--;

Column 12:

Line 14, change "by said" to --an --;
Line 15, change "electric motor" to --internal-combustion engine--;
Line 20, before "operating" insert --detected--;
Line 33, before "actual" insert --detected--;
Line 44, change "it take" to --for--
    change "be lowered" to --deceases--;

UNITED STATES PATENT AND TRADEMARK OFFICE
CERTIFICATE OF CORRECTION

PATENT NO. : 5,821,706
DATED : October 13, 1998
INVENTOR(S) : Hisamitsu KOGA

It is certified that error appears in the above-identified patent and that said Letters Patent is hereby corrected as shown below:

Line 45, delete "down";
Line 49, change "it takes" to --for--;
Line 50, change "found to be not longer" to --shorter--.

Signed and Sealed this

Thirteenth Day of July, 1999

Attest:

Attesting Officer

Q. TODD DICKINSON

Acting Commissioner of Patents and Trademarks